United States Patent [19]

Tate

[11] 3,968,840
[45] July 13, 1976

[54] CONTROLLED RATE ACIDIZATION PROCESS

[75] Inventor: Jack F. Tate, Houston, Tex.

[73] Assignee: Texaco Inc., New York, N.Y.

[22] Filed: May 25, 1973

[21] Appl. No.: 363,934

[52] U.S. Cl. ............................... 166/280; 166/307; 166/308
[51] Int. Cl.² ............................................ E21B 43/26
[58] Field of Search ........... 166/280, 307, 271, 308; 252/8.55 C

[56] References Cited
UNITED STATES PATENTS

| | | | |
|---|---|---|---|
| 2,766,828 | 10/1956 | Rachford | 166/307 |
| 2,975,834 | 3/1961 | West et al. | 166/307 |
| 3,417,817 | 12/1968 | Moore | 166/307 |
| 3,441,085 | 4/1969 | Gidley | 166/307 |
| 3,620,305 | 11/1971 | Fulford | 166/307 |
| 3,634,237 | 1/1972 | Crenshaw et al. | 166/307 |

OTHER PUBLICATIONS

"New Fracture–Acid Method Looks Good", Oil & Gas Journal, June 1, 1959, p. 178.

Primary Examiner—Ernest R. Purser
Assistant Examiner—Jack E. Ebel
Attorney, Agent, or Firm—T. H. Whaley; C. G. Ries; Kenneth R. Priem

[57] ABSTRACT

A process is provided whereby a subterranean formation may be treated uniformly with acid at a controlled rate to a considerable distance from an injection point. The process includes an introduction of an acid which is solid but will slowly solubilize in water or brine in a subterranean formation. The introduction of the solid acid may take place via fracture fissures in the formation and also if desired in conjunction with a propping agent.

6 Claims, No Drawings

CONTROLLED RATE ACIDIZATION PROCESS

BACKGROUND OF THE INVENTION

1. Field of the Invention

The invention relates to the treatment of subterranean formations in order to increase productivity or injectivity of such formations by an improved fracture acidizing technique.

2. Description of the Prior Art

Many petroleum-containing reservoirs are composed of limestone, dolomite or sandstone of low permeability. Although limestone and dolomite formations may contain large quantities of petroleum materials their permeabilities are generally quite low so that the oil production rates from them may be uneconomic because of resistance of the formations to fluid flow. Areas in the formation a substantial distance from the producing wells penetrating the formation may not be drained at all. A common method that has been used in an effort to stimulate production from such formations has been acidization. That is, acid is generally pumped down the well and displaced into the formation to dissolve a part of the formation and create channels of increased permeability thereby increasing fluid conductivity in the formation. Limestone or dolomite formations are generally best treated with hydrochloric acid or a similar acid and sandstone formations are treated with a mixture of hydrochloric and hydrofluoric acid. It is often necessary to pump the acid into the formation at a rate that will fracture the formation thus conducting it rapidly therein to avoid expending the acid in the area near the well bore. If the acid is expended only around the well bore it will have no beneficial effect in increasing transmissibility of fluid present a substantial distance from the well bore.

However, the presence of fractures extending from the well into the surrounding formations does not necessarily greatly increase the amount of acid that reaches substantial distances from the well bore before being spent by reaction with the formation. The high temperature of most subterranean formations and the extremely rapid reaction of the mineral acids which are used causes most of the acid to be neutralized by reaction with the calcareous formation before it can traverse a great distance into the formation from the well bore. One prior art method that has been used in an effort to acidize fractures more effectively has been to protect the faces of the fractures by coating them with a material such as a gel that will be slowly destroyed by the acid as it is displaced into the fracture. However, these coatings are only partially effective because the coating on that portion of the fracture closest to the well is the first to be contacted with acid and destroyed. Acid subsequently displaced into the fracture passes and contacts the exposed surface of the formation close to the well and is largely spent so that insufficient acid reaches the outer parts of the fracture. Similarly, sometimes fluid-loss reducing additives such as fine silica flour are added to control leak-off but the acid can quickly sweep the flour away and reacts rapidly with the thus exposed calcareous surface channels near the borehole so that much of the acid is again lost before reaching the outer limits of the fracture.

The difficulties in acidizing fractures at substantial distances from the well are aggravated in hot carbonate formations because the acid treatment methods heretofore available have resulted in little more than borehole enlargement at the high rate of reaction at the elevated temperature existing in such formation. The elevated temperature existing in hot carbonate reservoirs also aggravates the problem of inhibiting hydrochloric acid to prevent excessive corrosion by the acid of the casing and tubing in a well. Efforts have been made to pump large volumes of water ahead of the acid to cool the tubing and fracture faces. However, this procedure is not totally dependable and it is generally not desirable to pump large quantities of water into productive formations and especially not into gas reservoirs. U.S. Pat. No. 3,707,192 attempts to solve this problem by a multiple stage injection procedure whereby two substances are pumped into the formation sequentially; the second reacting with the first to form an acid capable of reacting with at least a portion of the formation. This method, however, requires two reactants to mix within the fracture to produce the acid. Such a process would be wasteful and a high efficiency of mixing would be unexpected in porous media. More importantly, the cited reactions would be expected to be very rapid and thus spent very quickly as in most other prior art processes.

It is an object of my invention to solve these problems by using an acid which will slowly solubilize in an aqueous medium. This acid in solid form may be pumped into the formation through fracture fissures to great distances from the borehole where it then slowly dissolves thereby removing the problem of rapid reaction near the well bore and effecting continuous etching of the fracture surface which is known to greatly improve treatment effectiveness by establishing communication between well bore and the extremity of the fracture.

A further object is to utilize the solid acid to prop the created fracture during the initial stages of production while the acid is undergoing dissolution.

SUMMARY OF THE INVENTION

The invention is a process for increasing productivity in a subterranean formation penetrated by a well bore by acidization which comprises forcing a fracturing fluid down a well bore under sufficient pressure to fracture the formation and displacing into the fractured formation fracturing fluids having suspended therein a solid acidic material which will slowly dissolve forming an acidic solution which will attack the formation.

DESCRIPTION OF THE PREFERRED EMBODIMENTS

The process of my invention involves the general concept of placing a solid acidic material into fractures surrounding a well bore so that the acidic material will be at a maximum distance from the well bore before it dissolves appreciably and attacks the formation. Therefore, the presence of water is essential and may be in the formation and/or contained in a fluid to accompany the acid into the formation through the well bore or both.

In the process of my invention a well is drilled in a conventional manner to the subsurface formation to be treated and may be completed, preferably by setting casing and tubing and perforating through the casing of the well. The completion may be of the open hole type, though these are less amenable to fracturing because of the usually great interval exposed. A fracture is then formed by any conventional fracturing technique in which a suitable fracturing liquid is displaced down the well at a rate causing the pressure on the liquid and formation to increase until the formation fractures, generally referred to as "breaking down". Break down of the formation is indicated to those on the surface by a drop in the pressure required to pump the liquid into the well at a constant rate. Because of the high pressures involved, liquids used in fracturing may contain a material which will reduce the leak-off of liquid into the formation and thereby reduce the pumping rate required to build the pressure to a level high enough to cause break down of the formation. Gelling materials that increase the viscosity of the liquid are frequently used in fracturing liquids to reduce leak-off. If the fracturing liquid is an oil such as diesel oil, kerosene or crude oil, suitable gelling agents are aluminum naphthanate and mixtures thereof with aluminum oleate, hydroxy aluminum soaps of fatty acids and aluminum and other metal soaps of fatty acids derived from oil such as coconut oil, peanut oil and the like. If an aqueous fracturing liquid is used natural gums as for example, karaya, batu or gaur gum can be used to increase the viscosity of the fracturing fluid. Polymeric materials may also be used if desired. Other additives for reducing fluid loss can be used. Suitable fluid loss additives for use in an oil-base fracturing liquid are described in U.S. Pat. No. 2,779,735. Fluid loss additives may not be necessary if the formation has a very low permeability and therefore has a natural resistance to the flow of fluids.

If the formation to be treated with my invention has sufficient water existing within it to solubilize the solid acid being placed in the formation an aqueous or nonaqueous base fracturing fluid may be used. However, if the formation contains no water an aqueous fracturing fluid should be used.

In the process of my invention the fracturing fluid containing solid acid is propagated through the reservoir, and the solid acidic material is deposited in the reservoir at all points where fractures extend. After the fractures have been extended to the desired radius about the well bore, injection of the fracturing fluid may be ceased. At this point the acid in the formation dissolves slowly and an acidic solution is formed at great distances from the well bore. This dissolution will take place over a period of time as connate or injected water flows through the fracture so that the acid may be placed to the outer extremities of the fractures before complete dissolution takes place. Thus, acid will be contacted at points far away from the well bore and the extent of permeability improvement because of acid etching of the reservoir matrix will be increased over conventional methods which dissipate most of the acid near the well bore.

Fracturing fluids of my invention may contain conventional additives and accompanying agents in addition to the solid acid of my invention. For example, propping agents such as sand, walnut hulls and the like may accompany the fracturing fluid and the solid acid into the formation.

Also, in addition to the solid acid of our invention, conventional acids such as mineral acids may be used in the fracturing fluid. It is clear therefore that the disclosure is not limited to processes wherein straight conventional fracturing is conducted. The process of my invention may be used in addition to prior art processes to much improve the distance from the well bore that is affected by acids. The advantage of solid acid used in these processes lies in implacement of the solid acid within the fractures initially propping them, and its subsequent slow dissolution into the connate water or the fracturing fluid, effecting continuing enlargement of passages in the formation by etching of the formation carbonate lining the fracture surface and even preventing deposition of carbonate scale within the formation and at the well bore by maintenance of a pH sufficiently low to prevent such deposition.

The acids useful in the method of my invention are solid acids which are slowly soluble in water. When an aqueous fracturing fluid is used the equilibrium solubility of the acid in water is preferred to be low so that the aqueous fluid to be used for fracturing will only dissolve a small amount of the acid at the surface. If the acid has a high equilibrium solubility, most of it would dissolve in the fracturing fluid at the surface and be dissipated by reaction near the well bore. If the acid has a low equilibrium solubility, a large portion of the solid acid will be placed far away from the well bore and will be dissolved in the formation either by water in the formation or by additional injected water to form an acidic solution.

Although not absolutely essential, it is preferred that the calcium salts of the acid be soluble in an aqueous medium.

Without intending to provide an exhaustive list of acids suitable in the method of my invention, the following is offered as a representative sample of suitable acids.

Inorganic acids, for example, sulfamic acid are suitable. Acids represented by the general formula:

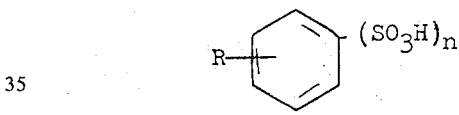

wherein $n$ is 1 or 2 and R is, for example, $-NH_2$, $-Cl$, $-OH$, $-NO_2$, alkyl, carboxyl or ether. The acids chosen from this group must of course be solid and it is preferred that their calcium salts be water soluble. Particularly preferred are the sulfonic acids:

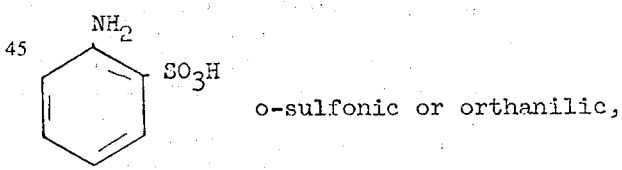

o-sulfonic or orthanilic, m-sulfonic or metanilic and p-sulfonic or sulfanilic

Other preferred acids are

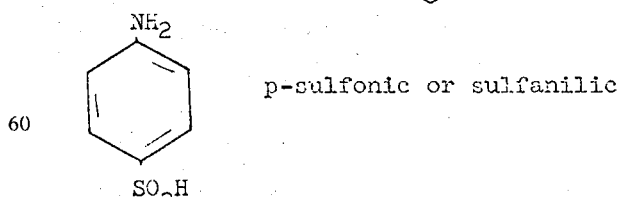

o-salicylic and

p-hydroxybenzoic.

Where the solid acid used is only slightly soluble in water such as orthanilic, metanilic, sulfanilic, o-salicylic and p-hydroxybenzoic, it may be used with an aqueous fracturing fluid. Where the solid used is very soluble in water the fracturing fluid should be nonaqueous such as crude oil, petroleum derivatives and other nonaqueous fracturing fluids known to the art.

The preferred acids referred to above are not surface active so that complications such as emulsion blocks should not arise. If, however, surface activity is desired in a given application in order to reduce retentive forces of capillarity between oil and water and thus increase displacement efficiency, an alkyl group such as dodecyl (lauryl) could be a ring substituent without appreciably effecting the acidic characteristics of the preferred acids. The surface activity of such chemicals is well known and they have been used in solubilized form as emulsifiers in retarded acid emulsion formulations. However, their use has heretofore been limited to liquid solutions which would have all the disadvantages overcome by this invention.

It is of course clear that any compatible additives normally incorporated into fracture-acidization processes, such as fluid loss agents, corrosion inhibitors, scale inhibitors and the like may be used in the method of my invention without effecting its operation.

EXPERIMENTAL

Laboratory experiments were conducted which demonstrate the workability and practicality of the invention.

EXPERIMENTAL PROCEDURE

Two hundred ml of distilled water was equilibrated at 30°C. in a 500 ml Erlenmeyer flask, immersed in the thermonstatted water bath and fitted with a mechanical stirrer. A cylindrical limestone or chalk core was then carefully introduced into the stirred solution followed by 5 g. of sulfanilic acid. The addition of the latter acid marked the beginning of the timing. Almost immediately, gas bubbles began to form upon the core surface at a very slow rate, indicating that the acid is solubilized immediately but at a slow rate. Three ml aliquots were periodically removed and analyzed for $CaCO_3$ content by a titrimetric procedure using ethylenediaminetetraacetic acid.

DATA INTERPRETATION

Data plots of weight $CaCO_3$ solubilized vs. reaction time were constructed, and the slope of the near linear plot determined to calculate the gm/hr. dissolved. (The slope may be considered to be independent of volume change in the reaction flask, since the sulfanilic acid reacts instantaneously as it dissolves, and such a relatively small volume was removed during an experimental run.) This slope, divided by the area of the core (22.1 $cm^{-2}$), assumed to be constant since only about 7% of its total weight was consumed during the experiment, gives the reaction rate in units of g. core/$cm^{-2}$ core area/hr.

| Limestone Material | Experimental Results | |
|---|---|---|
| | Slope (g/hr.) | Rate (g/cm$^2$ . hr.) |
| Austin Chalk | 0.21 | 0.95 × 10$^{-2}$ |
| Oswego Limestone | 0.12 | 0.54 × 10$^{-2}$ |

The above presented experimental data proves the utility of the invention. The solid, crystalline sulfanilic acid, which may easily be incorporated into the fracturing slurry reacts extremely slowly with the representative calcareous material due to its slow rate of solubilization. A particular advantage is that the reaction though slow in rate, proceeds to completion because of the strength of the acid. The calcium salt of the acid is soluble, so that formation plugging will not occur.

FIELD EXAMPLE

A Desert Creek limestone reservoir having perforations at 5596'–5606', 5622'–5638' and 5652'–5654' is chosen for treatment. Rods and tubing are pulled and the well cleaned out. A bridge plug is set at 5658' and a packer at 5612', so that the productive 5596'–5606' interval may be stimulated.

Since well tests and past production history indicates $CaCO_3$ scale deposition in the near well bore vicinity, the disclosed solid acid treatment is combined with a conventional 15% HCl acid-fracture. No conventional propping agent is utilized except the solid acid, since the etching of the calcareous fracture surface will prevent fracture healing. No fluid loss agent is deemed necessary since adequate pumping rate to effect fracturing in this formation can be attained without its use.

The formation is treated with 8000 bbl, 15% HCl into which 1000 pounds of technical grade sulfanilic acid is incorporated. Sand is incorporated into the treating system for fracture propping. The pumping rate averages 7.0 bbl/minute, reaching a maximum of 7.5 bbl/minute. Average pumping pressure is 2000 psi with a maximum of 2900 psi. Initial shut in pressure is 1300 psi, declining to 1000 psi after 15 minutes. The rods and tubing are reinstalled and the well is immediately returned to production. The pre-treatment production rate was 20 bbl/day. Post-treatment rate is 68 bbl/day 1 month after treatment.

I claim:

1. A process for increasing the productivity of a subterranean formation penetrated by a wellbore comprising forcing a fracturing fluid into the formation under sufficient pressure to fracture the formation wherein the fracturing fluid has suspended therein a solid acidic material of the formula:

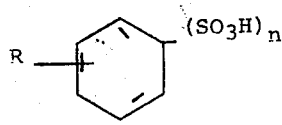

wherein $n$ is 1 or 2 and R is $NH_2$, —Cl, —OH, —$NO_2$, alkyl, carboxyl or ether which will slowly dissolve upon contact with sufficient aqueous medium and attack the formation and, displacing the fracturing fluid and suspended solid acidic material into the fractured formation.

2. A process as in claim 1 wherein the fracturing fluid is an oil.

3. A process as in claim 1 wherein the fracturing fluid is aqueous.

4. A process as in claim 1 wherein the acid said solid acidic material is of the formula:

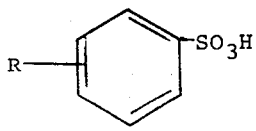

wherein R is —NH.

5. A process as in claim 1 wherein the solid acidic material is taken from the group consisting of sulfanilic, metanilic, orthanilic, o-salicyclic and p-hydroxybenzoic.

6. A process for increasing the productivity of a subterranean formation penetrated by a wellbore comprising forcing a fracturing fluid into the formation under sufficient pressure to fracture the formation wherein the fracturing fluid has suspended therein sulfanilic acid which will slowly dissolve upon contact with sufficient aqueous medium and attack the formation and, displacing the fracturing fluid and the suspended sulfanilic acid into the fractured formation.

* * * * *